Figure 1:
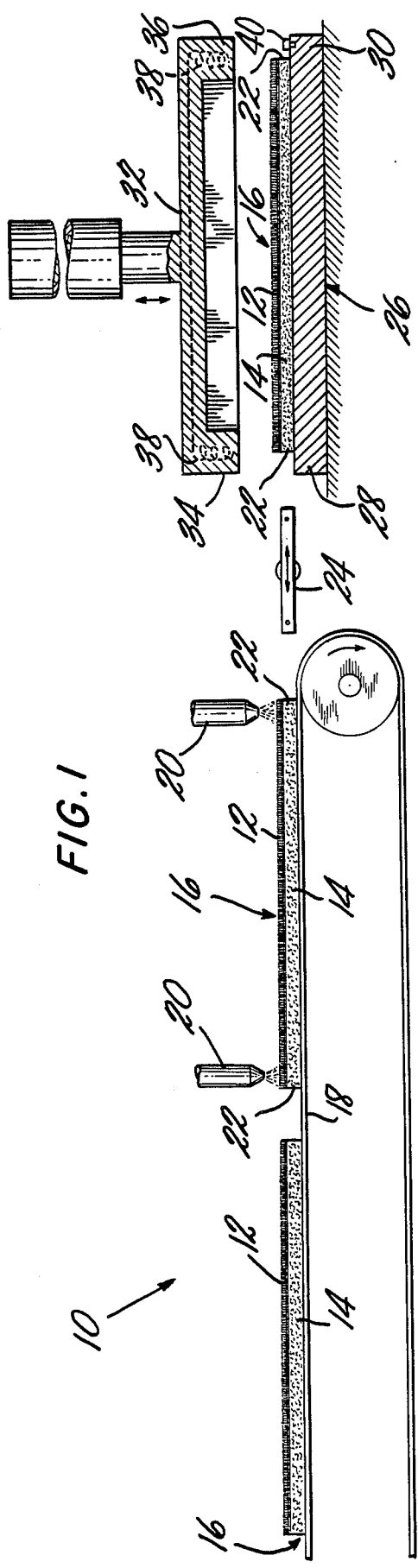

United States Patent [19]

Hillman

[11] Patent Number: 4,711,685
[45] Date of Patent: Dec. 8, 1987

[54] SOFT TEXTURED REVEAL EDGE CEILING BOARD AND PROCESS FOR ITS MANUFACTURE

[75] Inventor: Theodore E. Hillman, Cloquet, Minn.

[73] Assignee: USG Acoustical Products Company, Chicago, Ill.

[21] Appl. No.: 924,124

[22] Filed: Oct. 30, 1986

Related U.S. Application Data

[63] Continuation of Ser. No. 395,586, Jul. 6, 1982, abandoned.

[51] Int. Cl.⁴ .................. B32B 5/02; B32B 31/20; B32B 31/22
[52] U.S. Cl. .................. 156/220; 156/222; 264/284; 427/370; 428/81; 428/192; 428/218
[58] Field of Search ............ 428/70, 71, 76, 81, 428/88, 82, 45, 96, 95, 113, 218, 192, 194, 200, 350; 156/45, 196, 85, 220, 88, 222, 155, 198, 272.2, 219, 321, 300, 314, 278, 305, 328; 427/337, 342, 370; 264/284, 293, 510, 243, 548, 289.6, 343, 561, 342; 101/32; 162/305, 304, 157.1

[56] References Cited

U.S. PATENT DOCUMENTS

| | | | |
|---|---|---|---|
| 2,803,188 | 8/1957 | Duvall | 264/293 |
| 3,074,835 | 1/1963 | Gordon | 428/88 |
| 3,355,345 | 11/1967 | Braun | 150/515 |
| 3,616,120 | 10/1971 | Warwick | 428/81 |
| 3,832,250 | 8/1974 | Pearson | 156/40 |
| 3,920,872 | 11/1975 | Ollinger | 428/95 |
| 4,073,230 | 2/1978 | Akerson | 101/32 |
| 4,187,130 | 2/1980 | Kautz | 156/45 |
| 4,222,803 | 9/1980 | Kent et al. | 156/85 |
| 4,419,412 | 12/1983 | Gross | 428/88 |
| 4,454,187 | 6/1984 | Flowers et al. | 150/220 C |
| 4,478,660 | 10/1984 | Landler | 150/222 |
| 4,495,013 | 1/1985 | Walker et al. | 150/220 |

Primary Examiner—Donald E. Czaja
Assistant Examiner—Louis Falasco
Attorney, Agent, or Firm—Lucas & Just

[57] ABSTRACT

A fabric-surfaced fiber board having pressed and non-pressed portions. The board includes a low density fiber board composition having a re-activatable binder therein and having a fabric bonded thereto to form a laminate therewith. The laminate has peripheral portions wherein said fiber board composition has been compressed and reformed to have a reduced height, a higher density and a greater strength as compared to the non-pressed portion of the board.

14 Claims, 2 Drawing Figures

U.S. Patent  Dec. 8, 1987  4,711,685

SOFT TEXTURED REVEAL EDGE CEILING BOARD AND PROCESS FOR ITS MANUFACTURE

This is a continuation of application Ser. No. 395,586, filed July 6, 1982, now abandoned.

The invention relates to a process for making a fabric covered ceiling board of the type having exposed or revealed edges in a typical installation.

Fabric covered reveal edge ceiling boards are known in the art. Conventionally, the fabric for the reveal edge ceiling boards is glued to a previously formed wood fiber or mineral fiber structure having a face portion protruding from a base portion of greater periphery. The edges of the face portion may be regular or irregularly shaped. To avoid wrinkling, the fabric cover may be required to be precisely cut and fitted by hand. To avoid the need for this, U.S. Pat. No 4,222,803 issued Sept. 16, 1980 to Kent, et al. teaches that a stretchable fabric material can be utilized. When the fabric material is heated in a mold it stretches and gathers to fit snugly against the preformed ceiling board structure. However, this is a complex manufacturing process and requires the use of relatively expensive heat-shrinkable materials.

There has now been discovered a process for manufacturing a fabric-covered reveal edge ceiling board without the need for using coverings which are heat-stretchable and without the need for precise cutting and handfitting.

According to the invention, a carpet fabric is laminated to a flat sheet of wood or mineral fiber board of the type having a re-activatable binding agent incorporated therein. The surface of the carpet fabric at the periphery of the laminate is wetted with a liquid which will reactivate the binder, usually water. This may be accomplished by spraying the periphery of the board. Alternatively, the adhesive applied between the fabric and the ceiling board can have a carrier which performs the function of reactivating the adhesive. It will also be appreciated that the process in accordance with the invention may be carried out on line after the ceiling board has first been manufactured in the conventional Fourdrinier process and before the board has dried completely.

The periphery of the laminate is subjected to pressure between platens at a temperature high enough to vaporize the reactivating liquid. The volatized reactivating agent softens the binding agent at the peripheral portion of the laminate while the pressure of the platens reforms and densifies the periphery portion.

The resulting product is a reveal edge ceiling board. Because of the densification of the edge of the board caused by the heat and temperature, the resulting periphery of the product is actually substantially stronger than a regular ceiling board. This is in distinct contrast to normal reveal edge ceiling boards which are notoriously weak around the periphery.

Figure 2:
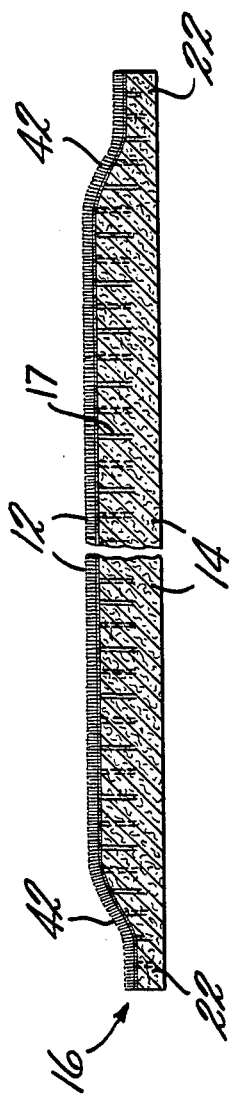

Further features and advantages of the process according to the invention will be seen from a description of the accompanying Figures wherein:

FIG. 1 diagramatically shows a process for forming a reveal edge structure in accordance with the invention, and FIG. 2 is a section of a reveal edge laminate in accordance with the invention.

In FIG. 1 a diagram of the process in accordance with the invention is shown generally at 10. A carpet fabric 12, suitably a needle-punched carpet fabric, is initially bonded to a low density ceiling board 14, conveniently by roll coating the surface of the fiber sheet 14 with a suitable adhesive such as a water based latex glue, to form a laminate 16. Preferably, a thermosetting resin is backcoated on the board, either prior to or after affixing the carpet fabric in order to reduce the likelihood of warping of the ceiling board during subsequent operations on the board. Normally the ceiling board will be from about ½ to about 2 inches in thickness and will have a density from about 10 to about 30 pounds per cubic foot. More typically the board will have a nominal thickness of ¾ inch and a density of 10–18 pounds per cubic foot. For aesthetic reasons the surface size is preferred to be a nominal 2×2 feet, but it will be appreciated that it may be any desired size.

The ceiling board comprises fibers and a re-activatable binder. For best results, the ceiling board is a mineral fiber sheet of the type described in U.S. Pat. No. 4,073,230 issued Feb. 14, 1978 to Akerson. These mineral fiber boards have a density of from about 15 to 30 pounds per cubic foot. The mineral materials may be present in the following amounts:

| | |
|---|---|
| mineral fibers | from about 20% to about 85% |
| perlite | from 0% to about 50% |
| other mineral materials such as long glass fibers clay, asbestos, mica and the like | from 0% to about 30% |

The balance of the composition is made up of a binder system. The binder system comprises cellulosic fibers and a re-activatable binding agent. The binding system can comprise:

| | |
|---|---|
| Total binding system | from about 15% to about 25% |
| cellulosic fibers | from 0% to about 15% |
| re-activatable binding agent | from about 10% to about 25% |

The cellulosic fibers may be wood fibers, primary or secondary paper fibers, cotton linters or the like. The fiber length will generally be up to about one-quarter inch in length. The preferred fibers for use in the present invention are newsprint fibers which will generally have a length of from about ¼ millimeter to about five millimeters with an average length in the neighborhood of one millimeter.

The preferred compositions of the present invention comprise:
 (a) from about 75% to about 85% by weight mineral material, said mineral material being composed of:
  (i) from about 70% to about 85% mineral fibers;
  (ii) from 0% to about 30% perlite;
  (iii) from 0% to about 10% of other mineral materials;
 (b) from about 15% to about 25% of a binding system, said binding system being composed of:
  (i) from about 5% to about 15% by weight cellulosic fibers;
  (ii) from about 10% to about 20% of a re-activatable binding agent.

A re-activatable binding agent is defined as one in which the binder may be made to set more than one time upon the application of heat and/or vapor. An analogous term is thermoplastic as opposed to something which is thermoset. As is well known, a thermoplastic material softens when exposed to heat and hardens again when cooled; a thermoset material solidifies or "sets" irreversibly when heated. The re-activatable binders of the instant invention are like thermoplastic materials in that they do not take an irreversible set and can be made to soften by heat and moisture or the like after which they can be activated anew. The preferred re-activatable binder is starch. Other suitable re-activatable binders include latex binders such as vinyl acetate/acrylic copolymers, styrene butadiene, polyvinyl acetate and the like.

Preferably the board is back coated in conventional manner with one of the known phenolic resins as described in U.S. Pat. Nos. 3,077,945 or 4,089,740 to substantially overcome any tendency of the board to warp during the reforming of the periphery portions.

In the preferred embodiment the board is acoustically punched in known manner prior to application of the fabric. The fabric portion of the laminate is suitably any of the known carpet fabric materials including woven cloth material Preferably the fabric is a needle-punched polyester carpet fabric or a woven material.

The laminate 16 is subsequently passed by means such as conveyor belt 18 under a spray device 20 where the periphery portion 22 of the surface of carpet fabric 12 is sprayed with a liquid capable of reactivating the binder. For a starch binder in a nominal ¾ inch ceiling board, application of water at a rate of about 6 to about 10 grams per square foot is suitable. It will be appreciated that the laminate 16 may be completely wetted by passing through a pair of rollers (not shown) for roller coating the surfaces or that the laminate can be subjected to a curtain coating device (also not shown).

As brought out above, the adhesive for binding the carpet to the ceiling board may also include a carrier capable of reactivating the binder. In such cases, the further step of re-wetting the binding agent may be unnecessary. The essential feature in accordance with the invention is that the binding agent be in a reactivatable condition. Therefore, the inventive method may also be performed in line after the manufacture of the board in a conventional "wet" process so long as the binder system of the ceiling board is in a reactivatable condition because of the moisture retained in the board.

The wetted laminate is then transferred by conventional means 24 to a stationary press platen 26. Platen 26 has elevated heated portions 28 and 30 corresponding to the peripheral portions 22 of the laminate 16. An upper platen 32, for instance, a platen of a hydraulic press (not shown) is lowered to press the periphery of the sheets between heated bosses 34 and 36 also corresponding to the periphery portion 22 and the stationay platen 26. It will be appreciated that for reforming a normal square sheet the bosses 34 and 36 may be a continuous, interiorly open square as may the elevated portions 28 and 30. The bosses and elevated portions are held within a predetermined temperature range, preferably from about 275° F. to about 500° F. in the case of water, by for example, electric heaters 38.

When the heated bosses 34 and 36 are pressed into the periphery portion 22 of the wetted laminate 16, the combination of heat and pressure causes the water to form steam which penetrates the mineral fiber sheet 14 to soften the re-activatable binding agent. The softened surface of periphery portion 22 is deformed by the heat and pressure of the bosses 34 and 36.

A pressure in the range of about 50 to about 100 pounds per square inch has been found sufficient for providing the required deformation. However, the press is preferably limited by a mechanical stop 40 so that the periphery portion 22 is deformed to a predetermined thickness to provide a much denser periphery portion of density in the range of about 30 to about 40 pounds per cubic foot, It will also be appreciated that only a portion of the periphery may be subjected to such pressure or that if desired other portions of the laminate may also be reformed in accordance with the process of the invention.

It is believed that the spray of liquid, especially water, onto the periphery edges of the carpet fabric protects the carpet fabric from melting or scorching from the heat of the platen bosses 34 and 36. It is therefor preferred that water be the reactivatable liquid as opposed to alcohols, ketones or other low volatility products.

As the ceiling board periphery is being reduced in thickness at the periphery, the carpet fabric is also softened by the steam. If the carpet fabric is of a stretchable nature, the contour of the laminate edges will tend to conform to the shape of the platens. Preferably, the carpet fabric is relatively less stretchable so that the tension on the carpet between the unchanged middle portion and the reformed peripheral portion creates a region of compression acting inwardly from the platens. The pressure thus created acts against the softened inner peripheral portions to create a rounding, or softened pillow effect at the edges of the face of the laminate.

Thus, as best seen in FIG. 2, the final carpet covered mineral fiber sheet having densified periphery portions 22 also has a rounded or softened pillow portion 42 from the downward pressure of the tension in the carpet created by the pressure of the bosses 34 and 36 as they deform the periphery portion 22.

The composite board is then allowed to cool whereupon the binding agent resets and the laminate 16 retains its new shape. The resulting fabric covered reveal edge ceiling board is very pleasing in appearance, has a very good NRC and has very strong edges.

EXAMPLE 1

In one specific embodiment of the present invention a polyester, needle-punched carpet fabric of the type typically sold as wall covering material was glued with a water based latex resin (National Starch's 40-0129) to a ceiling board having a nominal 15 pound per cubic foot density, ¾ inch thickness and 2×2 foot dimensions. The board was a standard product of Conwed Corporation, St. Paul, Minn. comprising mineral fibers, perlite, comminuted newspaper and a starch binding agent. The water based latex resin was allowed to dry before further steps were carried out. Water was sprayed on the peripheral surface of the carpet fabric at an application rate of about 8 grams per square foot. The wetted laminate was transferred to a press in which the upper platen was held at a temperature of 350° F. while the lower platen was held at a temperature of 400° F. The peripheral portion of the upper platen extended beyond the surfaces of the platen. The peripheral portion of the composite was then pressed between the platens to a thickness of about ⅜ inch. This distance was fixed by a mechanical stop. The compressed edge had a density of about 30 pounds per cubic foot. The product was then removed from the press.

EXAMPLE 2

The carpet fabric and ceiling board of Example 1 were glued with a water based latex resin having 60% solids content and 40% water as a carrier. The adhesive was applied at a rate of approximately 13 grams per square foot. The ceiling board and carpet were not wetted further. The laminates thus formed were stacked to retard any loss of moisture. The laminates were then further processed as described in Example 1. The binder system in the ceiling board remained reactivatable under these conditions for up to approximately 10 hours.

EXAMPLE 3

The carpet fabric of Example 1 was laminated as described in Example 1 to a recently manufactured and only partially dried ceiling board which retained about 6-7% water. The laminates were not wetted further. The laminates were further processed as described in Example 1. The binder system in the ceiling board was reactivatable under this condition.

The ceiling board according to the invention had an interior portion of relatively low density for excellent sound absorbing characteristics. The peripheral portion is an integrally formed high density portion having greatly increased mechanical strength. The deformation of the peripheral portion of the low density board simultaneously creates the edges of a fabric covered revealed edge ceiling board and a strengthened edge.

It will be further appreciated that a densified portion in accordance with the invention may be provided at points other than the periphery. For example, if the bosses of the upper platen also comprise a pair of crossed line members intersecting at the center of the upper platen, a 1×1-foot reveal edge structure may be simulated in the normal 2×2-foot laminate.

It will be understood that the claims are intended to cover all changes and modifications of the preferred embodiment of the invention herein chosen for the purpose of ilustration which do not constitute departures from the spirit and scope of the invention.

What is claimed is:

1. A process for manufacturing a reveal edge fabric surfaced ceiling board having pressed and non-pressed portions comprising the steps of:
    (a) bonding a fabric to one face of a preformed ceiling board, said ceiling board comprising wood fibers or mineral fibers and a re-activatable binder to form a laminate of said fabric and said preformed ceiling board; and
    (b) simultaneously heating and pressing the periphery portion of the ceiling board while said reactivatable binder in said periphery portion is in a reactivatable condition to form a reveal edge ceiling board, said reveal edge being a portion of reduced height, higher density and greater strength as compared to a non-pressed portion of the ceiling board.

2. The process of claim 1 further comprising the step of applying a thermosetting resin to the other face of the ceiling board.

3. The process of claim 1 wherein the step of heating is carried out at a temperature within the range of about 275° F. to about 500° F.

4. The process of claim 1 wherein the applied pressure in the pressing step is greater than about 50 pounds.

5. The process of claim 1 wherein the reactivatable binder in the laminate is placed in reactivatable condition by wetting at least a portion of the laminate with a liquid capable of reactivating the binder.

6. The process of claim 1 or 5 wherein the binder comprises starch and the liquid is water.

7. The process of claim 6 wherein said water is sprayed at a rate in the range of about 6 grams per square foot of surface to be wetted to about 10 grams per square foot of surface to be wetted.

8. The process of claim 1 wherein said fabric is a needle-punched carpet fabric.

9. The process of claim 1 wherein said fabric is a woven fabric.

10. A process for manufacturing a fabric surfaced mineral fiber board comprising the steps of bonding a fabric to a preformed low density mineral fiber board having a re-activatable binder to form a laminate of said fabric and said preformed low density mineral fiber board; placing the re-activatable binder in the periphery portion of the laminate into a reactivatable condition; simultaneously heating and pressing said periphery portion for compressing and reforming said periphery portion to have reduced height and higher density as compared to the non-peripheral portion of the ceiling board.

11. The process of claim 10 wherein the composition by weight of the mineral fiber board is within the range
    mineral fibers—from about 20% to about 85%
    perlite—from 0% to about 50%
    other mineral materials—from 0% to about 10%
    binders, including a re-activatable binding agent— from about 15% to about 25%,
and the density of said mineral fiber board prior to reformation is within the range of from about 14½ to about 16 pounds per cubic foot.

12. A fabric surface fiber board laminate having pressed and non-pressed portions manufactured in accordance with the following process:
    (a) bonding a fabric to one face of a preformed ceiling board, said ceiling board comprising wood fibers or mineral fibers and a re-activatable binder to form a laminate of said fabric and said preformed ceiling board; and
    (b) simultaneously heating and pressing the periphery portion of the ceiling board while said reactivatable binder in said periphery portion is in a reactivatable condition to form a reveal edge ceiling board, said reveal edge being a portion of reduced height, higher density and greater strength as compared to the non-pressed portion of the ceiling board.

13. A fabric-surfaced fiber board having pressed and non-pressed portions comprising a low density fiber board composition with a density of from about 10 to about 30 pounds per cubic foot including a re-activatable binder therein and having a fabric bonded thereto to form a laminate therewith, said laminate having peripheral portions wherein said fiber board composition has been compressed and reformed to have reduced height, a higher density and greater strength as compared to the non-pressed portion of the ceiling board.

14. The fabric-surfaced fiber board of claim 13 wherein said fiber board is a mineral fiber board including starch as the re-activatable binder.

* * * * *

UNITED STATES PATENT AND TRADEMARK OFFICE
CERTIFICATE OF CORRECTION

PATENT NO. : 4,711,685

DATED : December 8, 1987

INVENTOR(S) : Theodore E. Hillman

It is certified that error appears in the above-identified patent and that said Letters Patent are hereby corrected as shown below:

Column 6, line 6, change "aliquid" to --a liquid--.

Column 6, line 18, after "board" insert --having pressed and non-pressed portions--.

Signed and Sealed this

Twelfth Day of July, 1988

Attest:

DONALD J. QUIGG

*Attesting Officer*

*Commissioner of Patents and Trademarks*